UNITED STATES PATENT OFFICE.

LEANDER W. BOYNTON, OF HARTFORD, CONNECTICUT.

IMPROVEMENT IN PREPARING MANURES FOR TRANSPORTATION.

Specification forming part of Letters Patent No. 133,404, dated November 26, 1872.

*To all whom it may concern:*

Be it known that I, L. W. BOYNTON, of Hartford, Hartford county, Connecticut, have invented a Process to Prevent Waste of Manure by Fermentation and Evaporation, and lessen the offense while handling, of which the following is a specification:

In order to accomplish the result required the manure should be made of a suitable consistency. When the manure is too soft to retain form, I mix dry peat or an equivalent to make it of the right consistency. This not only takes up the moisture, but helps to keep the piece when pressed in form. By pressing, the atmosphere is excluded from the manure, as far as practicable, and at the same time puts the manure so pressed in a suitable form for coating. The manure having been suitably concentrated, a coating is applied to the surface of the form, which makes it comparatively water and weather proof, and also serves to keep the form in shape. This may be accomplished by applying soft clay to the surface of the form; and to facilitate handling, the clay can be covered with dry peat, or any other suitable material.

It is not proposed to confine the coating to one article, or the form to one particular size, but to coat the form with any suitable material, and that the most convenient to obtain.

By the above process the manure retains its strength, and is less offensive while being handled or transported.

Claims.

1. Mixing peat or an equivalent with manure, to take up the surplus moisture, to give it consistency for pressing.

2. Concentrating manure to exclude the atmosphere, and coating the package so concentrated, to prevent fermentation and evaporation.

LEANDER W. BOYNTON.

Witnesses:
    J. W. BOYNTON,
    WM. N. JACKSON.